Patented Aug. 7, 1934

1,969,468

UNITED STATES PATENT OFFICE 1,969,468

PREPARATION OF HALOGENATED FATTY ACID ESTERS OF CELLULOSE

Carl J. Malm and Charles R. Fordyce, Rochester, N. Y., assignors to Eastman Kodak Company, Rochester, N. Y., a corporation of New York No Drawing. Application October 3, 1931, Serial No. 566,800

20 Claims. (Cl. 260—101)

This invention relates to the chloracylation of cellulosic materials by means of a chloracyl chloride or anhydride in the presence of a basic organic catalyst.

Heretofore in the esterification of cellulosic materials in which chloracyl compounds have been present, a non-basic catalyst has been employed and the chloracyl compounds were merely regarded as impellers or solvents as they did not contribute any chloracyl groups to the cellulose derivative formed.

It has been attempted to produce cellulose derivatives containing chloracyl groups by treating organic cellulose esters having saturated acyl groups with chlorine or phosphorus pentachloride but there are so many varying factors in that process, such as temperature, duration of reaction, amount of illumination (in the case of chlorine sunlight has been employed), catalysts, etc. that the results which are to be obtained cannot be predetermined. We have found that when chlorine is employed to prepare cellulose chloracylates from organic esters of cellulose containing saturated acyl groups that severe degradation of the cellulose molecule occurs so that it appears to break down into cellobiose or even perhaps sugars. The resulting product lacks in the qualities necessary in a cellulose derivative so that it has apparently little if any value other than as a chemical curiosity. Also that process, when chlorine is employed as the chlorinating agent, must depend on sunlight for the carrying out of the process, which dependence nullifies any commercial value such a process might otherwise have.

It has also been known to produce halogenated fatty acid esters of cellulose by first forming an ester of cellulose having an unsaturated fatty acid group and then saturating the group with chlorine atoms. That process however obviously cannot be employed when halogenated lower fatty acid groups such as chloracetyl are to be attached to the cellulose.

We have found a process of chloracylating cellulosic materials which is simple and easily controlled. We have found a process of forming esters of cellulose containing a chloracyl group in which the use of sunlight or other difficultly controllable details are absent. We have found a method of chloracylating cellulosic materials by means of derivatives of the chlorinated fatty acids. We have found, contrary to general belief, that the halogenated fatty acid anhydrides can be employed to esterify cellulosic materials with its own groups and that the cellulose esters containing halogenated fatty acid groups produced by our process are particularly resistant to the action of most organic solvents, which adapts those esters for many purposes for which many of the commonly known esters of cellulose are unsuitable. We have found that the product of our process is fire-resistant which property is characteristic of but few of the esters of cellulose.

Our process comprises the chloracylation of cellulosic material such as partially esterified esters of cellulose or cellulose ethers containing free hydroxyl groups by the use of a halogenated fatty acid chloride or anhydride and a basic organic catalyst such as pyridine, α-picolin, quinoline or a like base, preferably diluted with an organic solvent. Cellulose such as in the form of cotton or sulfite pulp may also be chloracylated by our process but the products formed have not been found to be as valuable as those formed from the chloracylation of partially esterified esters or ethers of cellulose.

The following examples are for purposes of illustration and are not intended to limit the scope of our invention:

Example I

About 50 lbs. of cellulose acetate having an acetyl content of 38% is dissolved in approximately 400 lbs. of ethylene chloride and 100 lbs. of pyridine. About 50 lbs. of chloracetyl chloride and 100 lbs. of ethylene chloride is then added and the mixture is maintained at a temperature of about 50° C. for approximately 10 hrs., when a solid jell is obtained. This jell of cellulose acetate-chloracetate, ethylene chloride and pyridine may be dissolved in methyl chloracetate and purified by precipitating and washing with methyl alcohol.

Example II

The same procedure is employed as in Example I except that chloracetic anhydride is used instead of chloracetyl chloride.

The products formed in the above examples are insoluble in the usual solvents such as acetone etc. which are employed for the dissolving of the ordinary esters of cellulose. However, they are soluble in the alkyl chloracetates which may be employed alone or mixed with diluents in the making of products from the esters produced according to our invention.

The chloracetic esters of cellulose are especially valuable for use for instance in cinematographic film due to their non-flammability or as filaments for the manufacture of fabrics, as due to the resistance of these esters to the commonly known solvents, such fabrics may be dry cleaned, which is not possible with many of the known fabrics composed of artificial filaments.

Our process may be employed for the production of esters of cellulose containing acyl groups of either the halogenated higher fatty acids or the halogenated lower fatty acids. Some of the esters which can be prepared by the use of corresponding halogenated fatty acid chlorides or anhydrides and a basic organic catalyst are:

Cellulose acetate-chlorlaurate, cellulose acetate-bromstearate, cellulose acetate-chlorpropionate, cellulose propionate-chlorbutyrate, cellulose ethyl ether-chloracetate, cellulose propionate-chloracetate etc. For instance if it is desired to prepare the cellulose acetate-chlorlaurate, a chlorlauric anhydride or chloride would be employed as the source of the halogenated higher fatty acid radicals which attach to the cellulose.

The chloracetyl compounds which may be employed may be the mono-, di- and/or tri-chloracetic anhydrides or chlorides and the groups which will be attached to the cellulose will correspond to those in the chloracetyl compounds originally employed. Our invention contemplates the use of the halogenated fatty acid anhydrides or chlorides generally and it is to be understood that the fluoro- bromo- and iodo-compounds corresponding to the chloro-compounds mentioned herein may be employed although as the chloro-compounds are the more common and give good results they will probably be ordinarily employed.

The term "cellulosic materials" as employed herein refers both to cellulose and to cellulose derivatives containing free hydroxyl groups available for esterification.

Various obvious modifications such as the use of a halogenated fatty acid in conjunction with an unsubstituted fatty acid anhydride to esterify cellulosic material, and the like, also come within the contemplation of our invention.

We claim as our invention:

1. A process of preparing a cellulose derivative containing a halogenated acyl group, which comprises treating cellulosic material with an esterifying bath comprising a compound selected from the group consisting of the anhydrides and the chlorides of the halogenated fatty acids in the presence of a tertiary organic base.

2. A process of preparing a cellulose derivative containing a halogenated acyl group, which comprises treating cellulosic material with an esterifying bath comprising a halogenated fatty acid anhydride in the presence of a tertiary organic base.

3. A process of preparing a cellulose derivative containing a halogenated acyl group, which comprises treating cellulosic material with an esterifying bath comprising a halogenated fatty acid chloride in the presence of a tertiary organic base.

4. A process of preparing a cellulose derivative containing a halogenated acyl group which comprises treating a cellulose derivative containing free and available hydroxyl groups with an esterifying bath comprising a compound selected from the group consisting of the anhydrides and the chlorides of the halogenated fatty acids in the presence of a tertiary organic base.

5. A process of preparing a cellulose derivative containing a halogenated acyl group, which comprises treating a cellulose derivative containing free and available hydroxyl groups with an esterifying bath comprising a halogenated fatty acid anhydride in the presence of a tertiary organic base.

6. A process of preparing a cellulose derivative containing a halogenated acyl group, which comprises treating a cellulose derivative containing free and available hydroxyl groups with an esterifying bath comprising a halogenated fatty acid chloride in the presence of a tertiary organic base.

7. A process of preparing a cellulose derivative containing a halogenated acyl group, which comprises treating a partially esterified cellulose ester with an esterifying bath comprising a compound selected from the group consisting of the anhydrides and the chlorides of the halogenated fatty acids in the presence of a tertiary organic base.

8. A process of preparing a cellulose derivative containing a halogenated acyl group, which comprises treating a partially esterified cellulose ester with an esterifying bath comprising a halogenated fatty acid anhydride in the presence of a tertiary organic base.

9. A process of preparing a cellulose derivative containing a halogenated acyl group, which comprises treating a partially esterified cellulose ester with an esterifying bath comprising a halogenated fatty acid chloride in the presence of a tertiary organic base.

10. A process of preparing a cellulose derivative containing a halogenated acyl group which comprises treating cellulosic material with an esterifying bath containing a halogenated fatty acid compound in the presence of a tertiary organic base.

11. A process of preparing a cellulose derivative containing a chloracyl group which comprises treating cellulosic material with an esterifying bath comprising a compound selected from the group consisting of chloracetic anhydride and chloride, in the presence of a tertiary organic base.

12. The chloracylation of cellulosic material in the presence of a catalyst selected from the group consisting of pyridine, quinoline and their alkyl substituted derivatives.

13. A process of preparing a cellulose derivative containing a halogenated fatty acid group which comprises treating a partially esterified cellulose acetate with an esterifying bath containing a halogenated fatty acid compound in the presence of a tertiary organic base.

14. A process of preparing a cellulose derivative containing a halogenated fatty acid group which comprises treating a cellulose derivative containing free and available hydroxyl groups with an esterifying bath containing a halogenated fatty acid, a fatty acid anhydride and a tertiary organic base.

15. A process of preparing a cellulose derivative containing a halogenated fatty acid group which comprises treating a partially esterified cellulose acetate with an esterifying bath comprising a halogenated fatty acid anhydride in the presence of a tertiary organic base.

16. A process of preparing a cellulose derivative containing a halogenated fatty acid group which comprises treating a partially esterified cellulose acetate with an esterifying bath comprising a halogenated fatty acid chloride in the presence of a tertiary organic base.

17. A process of preparing a cellulose acetate-chloracetate which comprises treating a partially esterified cellulose acetate with an esterifying bath comprising chloracetic anhydride in the presence of a tertiary organic base.

18. A process of preparing a cellulose acetate-chloracetate which comprises treating a partially esterified cellulose acetate with an esterifying bath comprising chloracetic chloride in the presence of a tertiary organic base.

19. The chloracylation of a partially esterified cellulose ester in the presence of a catalyst selected from the group consisting of pyridine, quinoline and their alkyl substituted derivatives.

20. The chloracylation of a cellulosic material in the presence of pyridine as the catalyst.

CARL J. MALM.
CHARLES R. FORDYCE.